United States Patent [19]
Calcagno et al.

[11] 3,980,833
[45] Sept. 14, 1976

[54] CALL MONITOR FOR TELECOMMUNICATION EXCHANGE

[75] Inventors: Piero Calcagno, Collegno (Turin); Enzo Garetti, Turin, both of Italy

[73] Assignee: CSELT - Centro Studi e Laboratori Telecommunicazioni SpA, Turin, Italy

[22] Filed: Apr. 28, 1975

[21] Appl. No.: 572,336

[30] Foreign Application Priority Data
Apr. 26, 1974 Italy ................ 68311/74

[52] U.S. Cl. .................. 179/15 AT; 179/18 FG
[51] Int. Cl.² ............................. H04J 3/14
[58] Field of Search ....... 179/15 AT, 18 ES, 18 FG, 179/18 EB, 18 FF

[56] References Cited
UNITED STATES PATENTS

| | | |
|---|---|---|
| 3,546,388 | 12/1970 | Kobus et al. ............ 179/18 FG |
| 3,673,340 | 6/1972 | Casella et al. ............ 179/18 J |
| 3,908,092 | 9/1975 | Hight et al. ............ 179/18 ES |

*Primary Examiner*—Thomas W. Brown
*Attorney, Agent, or Firm*—Karl F. Ross; Herbert Dubno

[57] ABSTRACT

A call monitor for a telephone exchange, including a processor intervening in the establishment of a connection between associated line links with the aid of a switching network, comprises a first memory storing information about each line link and a second memory containing codes that identify all possible states of a connection of interest to the processor along with all intervening conditions termed evolutions. During a time slot allocated to a particular line link, a multibit comparator receives data from the first memory concerning a connection involving that line link, along with updating information from the line link itself, on one set of inputs and further receives, on another set of inputs, a succession of evolutionary codes read out from the second memory until a match is detected; the read-out is then terminated and an instruction, if required, is sent to the processor and/or to the switching network.

8 Claims, 3 Drawing Figures

CALL MONITOR FOR TELECOMMUNICATION EXCHANGE

FIELD OF THE INVENTION

Our present invention relates to central-office equipment of a telephone or other telecommunication system, more particularly to a call monitor for an exchange serving a multiplicity of telecommunication lines through associated line links which can be temporarily interconnected with the aid of a switching network under the control of a processor.

BACKGROUND OF THE INVENTION

In such telecommunication systems, the momentary state of a connection between a calling and a called station — and therefore between two local line links temporarily allotted to the respective lines — is conventionally registered within the processor, e.g. with the aid of several circulating memories as described in U.S. Pat. No. 3,581,016. The data thus stored in the processor include not only ad hoc information, such as the addresses of the intercommunicating lines and the instantaneous activities thereof, but also standard and recurring functions relating to signal generation and transcoding, for example. This requires memories of high storage capacity within the processor, particularly in central offices or exchanges serving a large number of telecommunication lines.

OBJECT OF THE INVENTION

The object of our present invention, therefore, is to provide relatively simple circuitry in such an exchange for monitoring the progress of a call independently of the centralized processor and calling that processor into service only in certain stages of the progress of a connection requiring intervention of its dynamic storage facilities.

SUMMARY OF THE INVENTION

We realize this object, in accordance with the present invention, by providing in the exchange a first memory (which may be of any suitable conventional type) with a number of phases corresponding to the number of time slots in a scanning cycle, each phase being allocated to a respective line link, and a preferably static second memory of the read-only type containing codes which identify all possible states of a connection including those which are of interest to the processor and those intervening conditions which do not require more than the execution of certain switching operations. A comparator receives, during each time slot, stored data from the first memory and updating information from the corresponding line link on one set of inputs and a succession of evolutionary codes from the second memory on another set of inputs, a detection of a match halting the readout of codes from the second memory while initiating the readout of an accompanying instruction to the processor and/or to the switching network.

BRIEF DESCRIPTION OF THE DRAWING

The above and other features of our invention will now be described in detail with reference to the accompanying drawing in which.

SPECIFIC DESCRIPTION

Figure 1:
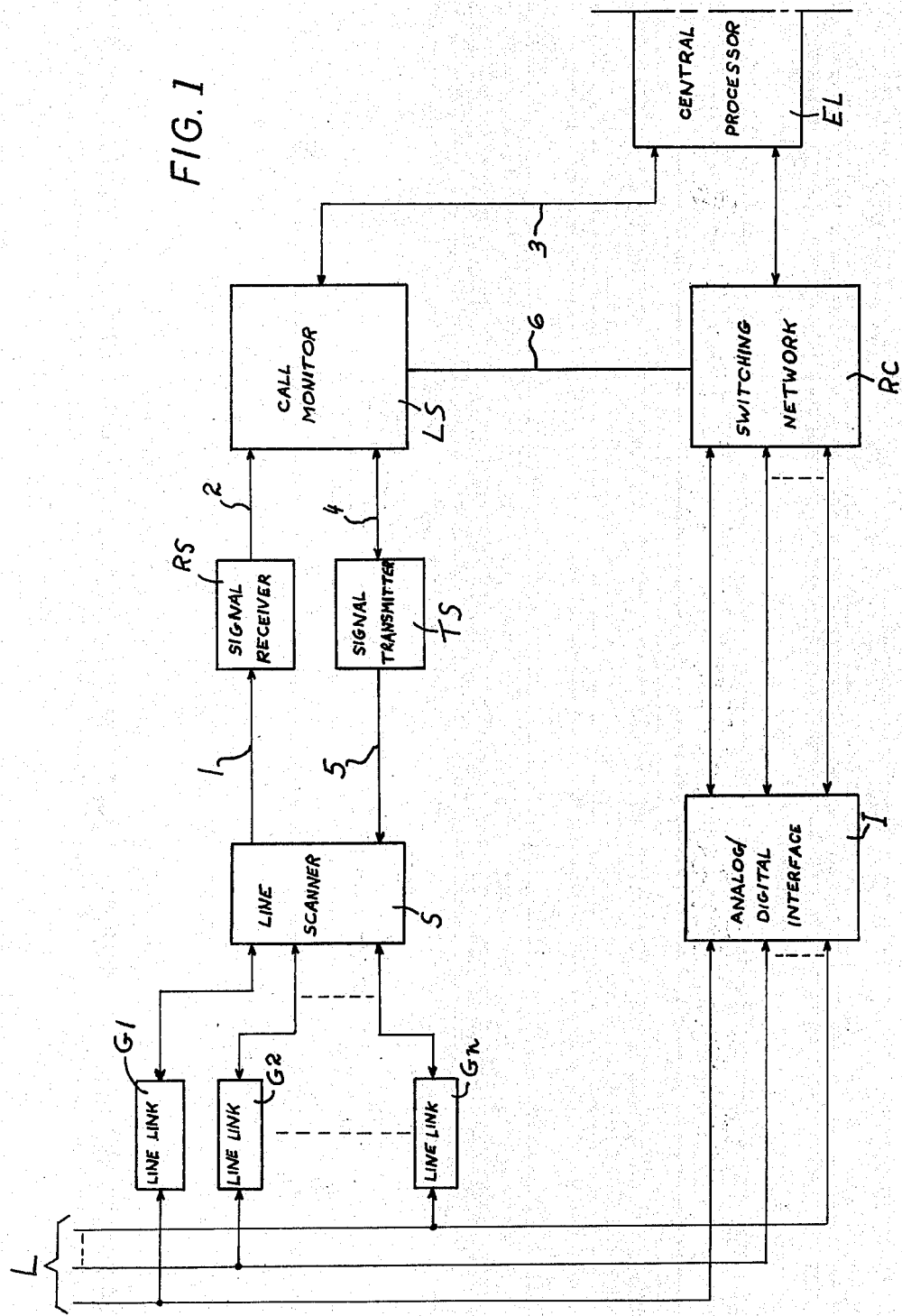
FIG. 1 is a block diagram showing the basic components of a central office equipped with a call monitor according to our invention.

In FIG. 1 we have shown a set of subscriber lines L which can be selectively connected with one another and are coupled, at least temporarily, to a multiplicity of local line links $G_1, G_2 \ldots G_n$. These line links may include the usual conductors for incoming and outgoing signals along with other equipment such as tone generators and (in case of PCM data transmission) synchronization-signal extractors. A line scanner S, periodically stepped under the control of a clock circuit included in a programmer CK (FIG. 2), samples the several line links in respective time slots of a scanning cycle. Incoming signals are fed to the centralized equipment by way of a lead 1 terminating at a signal receiver RS which evaluates the voltage samples from active lines, e.g. in the manner described in our commonly owned application Ser. No. 517,017 filed Oct. 22, 1974, and forwards the resulting information over a lead 2 to a call monitor LS more fully described hereinafter with reference to FIG. 2. Monitor LS communicates via a lead 3 with a central processor EL and can also transmit instructions by way of a lead 6 to a switching network RC. Unit LS further cmmunicates by way of a lead 4 with a transmitter TS for outgoing signals which are delivered by way of a lead 5 to the scanner S. It will be understood that leads 1-6 may each consist of multiple conductors. Signal transmitter TS may include a conventional coder for converting outgoing binary signals into specific waveforms. Subscriber lines L are also connected to switching network RC by way of an analog/digital interface unit I.

Figure 2:
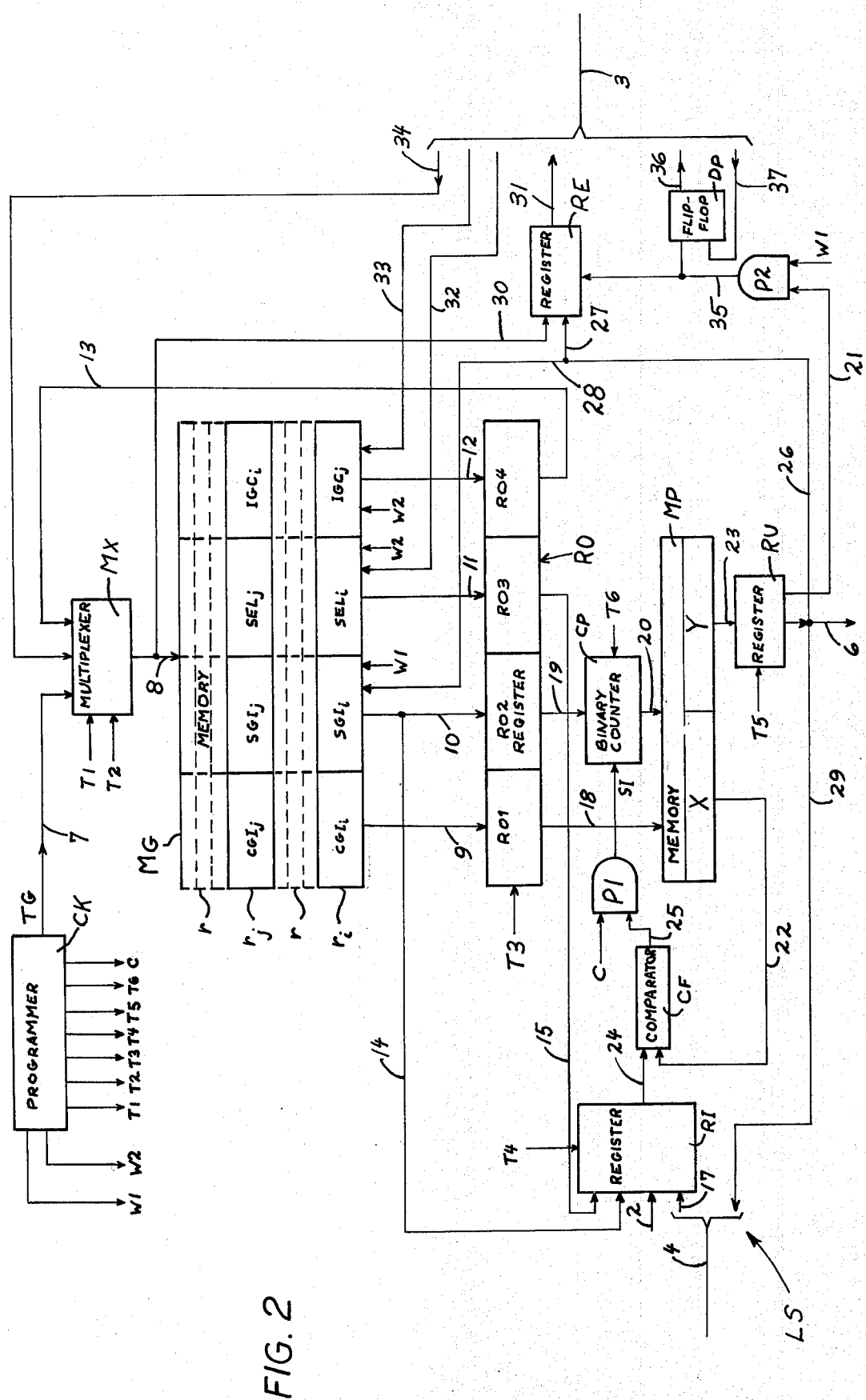
FIG. 2 is a more detailed diagram of the call monitor shown in FIG. 1.

We shall now describe, with reference to FIG. 2, details of the call monitor LS embodying our invention. The units of this call monitor are controlled, in a manner more fully explained below, by the aforementioned programmer CK generating output pulses T1, T2, T3, T4, T5, T6, TG, C, W1 and W2 which are energized at different times in the course of any time slot of duration $T_i$ (see FIG. 3). Output signal TG is a binary code word, transmitted over a multiple 7 to a multiplexer MX, which changes from one time slot to the next and represents the address of the line links $G_1$-$G_n$ (FIG. 1) which are sampled during these time slots. Multiplexer MX works via another set of conductors 8 into a primary memory MG with a multiplicity of phases $r$, as described in the aforementioned U.S. Pat. No. 3,581,016, for the storage of information relating to the activity of the respective line links. Two such phases, designated $r_i$ and $r_j$, are assigned to a pair of these line links which are assumed to have established communication with each other.

Each phase $r$ of memory MG consists of a row of storage elements subdivided into four sectors, i.e. a first sector containing the address code $CGI_i$, $CGI_j$ of the assigned line link, a second sector containing a coded information $SGI_i$, $SGI_j$ on the activity of that line link, a third sector $SEL_i$, $SEL_j$ carrying similar information on the state of an ongoing connection, if any, and a fourth sector which upon initiation or establishment of such a connection contains the address code of the communicating line link, i.e. a code $IGC_j$ in the case of phase $r_i$ and a code $IGC_i$ in the case of phase $r_j$ under the conditions here assumed.

Another memory MP, of the read-only type, consists of a multiplicity of pages storing, by conventional microprogramming technique, the codes of the various evolutionary states of a connection as discussed above. These evolutionary states can by cyclically read out, in the course of a single time slot, at an output X of memory MP which is addressed via a lead 20 (also a multiple) by a binary counter CP adapted to receive stepping pulses SI from an AND gate P1. Another output Y of memory MP carries instructions to be read out onto a lead 23 with the appearance of respective evolutionary codes in outlet X. These evolutionary codes are transmitted by a lead 22 to a set of inputs of a comparator CF having another set of inputs tied by a lead 24 to a buffer register RI. Another buffer register RO is divided into four sections RO1, RO2, RO3, RO4 having inputs linked via respective leads 9, 10, 11, 12 with corresponding sectors of whichever phase r of memory MG is in scanning position during a given time slot. A branch 14 of lead 10 extends to the input side of register RI, as does a lead 15 originating at register section RO3. Register RI further receives signals from units RS and TS of FIG. 1 by way of lead 2 and a lead 17 forming an incoming branch of the 2-way connection 4 between call monitor LS and signal transmitter TS. Register section RO1 has an output lead 18 extending to memory MP whereas section RO2 preloads the counter CP via a lead 19. A lead 13 extends from section RO4 back to multiplexer MX which also receives signals from processor EL via a lead 34 forming part of the connection 3. Other leads 32 and 33 carry information from the processor to the third and fourth sectors, respectively, of memory MG.

A branch 30 of lead 8 extends to a further buffer register RE. A fourth buffer register RU receives the instructions read out over lead 23 from memory MP and delivers them to switching network RC via lead 6; a branch 29 of that lead forms the outgoing part of connection 4 whereas another branch 26 thereof terminates at an input 27 of register RE and has an extension 28 leading to the second sector of the scanned phase of memory MG. The contents of register RE can be discharged via a lead 31, forming part of connection 3, into processor EL upon the energization of an output lead 35 of an AND gate P2 having an input tied by a lead 21 to an output of register RU. Lead 35 also extends to a setting input of a flip-flop DP with a set output 36 and a resetting input 37 tied to respective conductors of multiple 3.

The establishment of connections between output 8 and inputs 7, 13 and 34 of multiplxer MX is controlled by programmer pulses T1 and T2. Pulse T3 enables the loading of register RO from memory MG. Pulse T4 causes the simultaneous discharge from register RI, via lead 24, of all the data fed in by way of leads 2, 14, 15 and 17; thus, lead 24 consists of as many conductors as the combination of leads 2, 14, 15 and 17, the same being true of lead 22 inasmuch as circuit CF is to perform a bit-by-bit comparison between the data appearing on leads 22 and 24, respectively. Pulse T5 unloads from register RU the information fed in via lead 23 from memory MP. Pulse T6 reads the count of circuit CP into the address input 20 of memory MP. Pulse C opens the AND gate P1 for the passage of an output signal from comparator CF to the stepping input of counter CP. Pulse W1 enables the writing of the contents of register RU, via leads 26 and 28, in the second circuit of the operatively positioned phase of memory MG simultaneously with an unblocking of AND gate P2 for the discharge of register RE and the setting of flip-flop DP if, and only if, an instruction destined for processor EL is present in register RU. Pulse W2 enables the writing of information from the processor, arriving over leads 32 and 33, in the third and fourth sectors of the operative memory phase.

Figure 3:
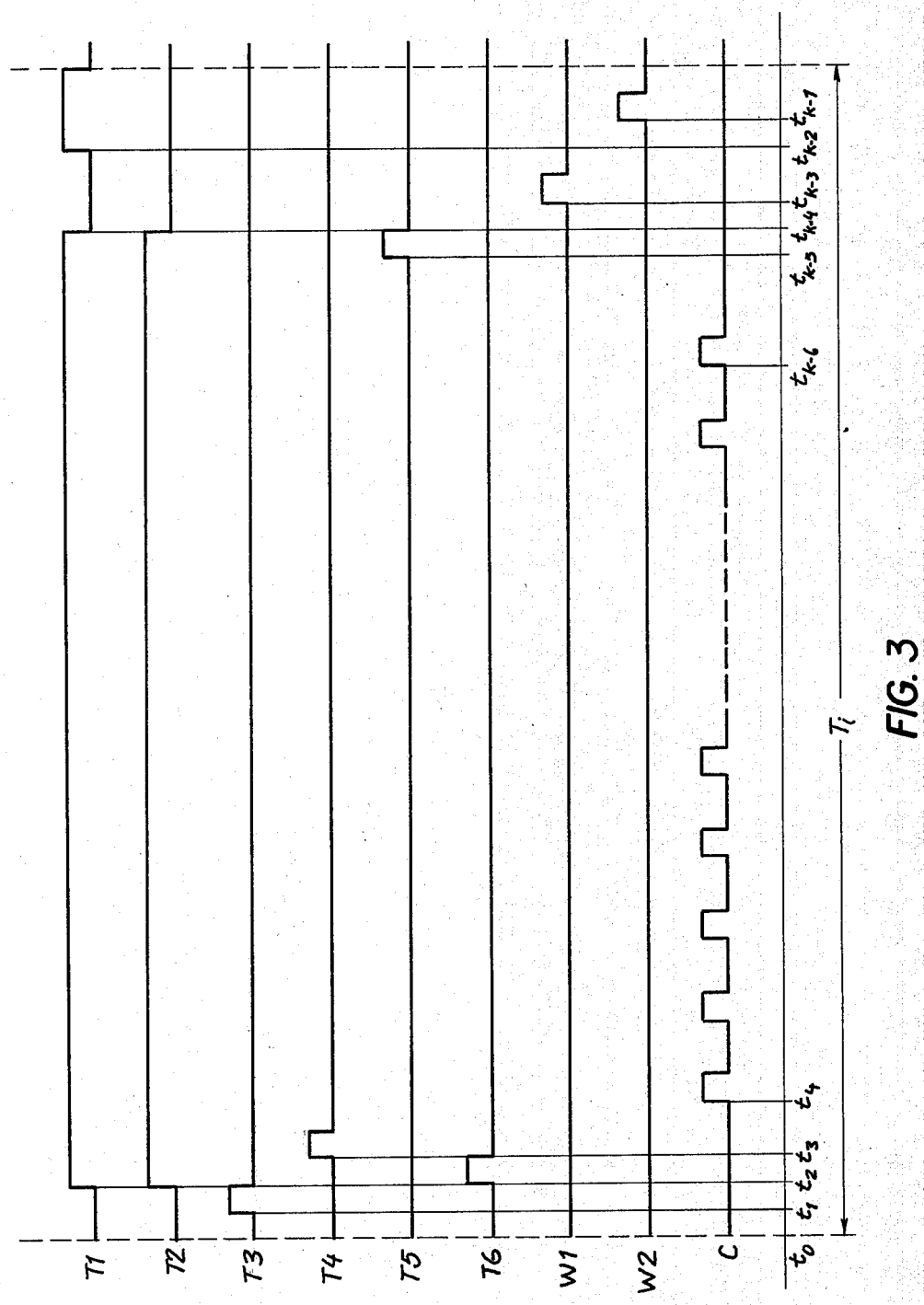
FIG. 3 is a set of graphs serving to explain the operation of the system of FIG. 2.

We shall now describe the operation of the system of FIG. 2 with reference to the several graphs of FIG. 3 showing a time slot $T_i$, allocated to the line link identified by memory phase $r_i$, which starts at an instant $t_0$ following by the usual guard interval the termination of the preceding time slot allocated to a different line link.

At instant $t_0$, the simultaneous absence of pulses T1 and T2 sets the multiplexer MX in a position in which the address code of the corresponding line link is transmitted from multiple 7 to multiple 8 as an instruction for the reading of the contents of phase $r_i$. The information stored in the several sectors of this memory phase is thus transmitted via leads 9–12 to the several sections RO1–RO4 of register RO, respectively.

Immediately thereafter, at instant $t_1$, register RO is loaded by pulse T3 so as to energize its output leads 18, 19, 15 and 13 with the information received from memory MG.

At instant $t_2$ the pulse T6 is generated along with pulses T1 and T2. The appearance of the latter two pulses switches the multiplexer MX into a position in which it activates its input lead 13 in lieu of lead 7 whereby the address $IGC_j$ of the communicating line link is read into the input lead 8 of memory MG as an instruction for the readout of the information stored in the second sector of phase $r_j$, i.e. the activity code $SGI_j$, via lead 14 to register RI. At the same time the corresponding data code $SGI_i$, previously read out from phase $r_i$ into register section RO2, is loaded into counter CP by way of lead 19 under the control of pulse T6. Since pulse C is absent, the transmission of a stepping pulse SI to the counter is blocked so that no further change takes place at this time in the contents thereof. The data from register section RO3 are introduced into register RI by lead 15. Memory MP receives the count on lead 20 together with the address code on lead 18 from counter CP and register section RO1, respectively. The address code on lead 18 selects in memory MP the page assigned to the corresponding line link whereas the count on lead 20 identifies on that page a particular revolutionary code determined by the activity code $SGI_i$.

At instant $t_3$, the appearance of pulse T4 simultaneously discharges into input 24 of comparator CF all the information loaded into register RI via leads 2, 14, 15 and 17. Input 22 of the comparator receives at the same time the evolutionary code read out from memory MP under the control of counter CP for bit-by-bit comparison with the contents of register RI. If the comparator fails to detect a match, it energizes its output lead 25; otherwise that lead carries zero voltage and no significant changes take place in the position of counter CP and memory MP for the remainder of the time slot.

At instant $t_4$ the programmer CK emits a series of pulses C to unblock the AND gate P1. This unblocking is ineffectual if lead 25 is de-energized because of an identity between the codes on comparator inputs 22 and 24. Otherwise, a stepping pulse SI advances the counter CP with each pulse C and thereby causes the readout of successive evolutionary codes from memory output X until the comparator CF responds and cuts off the stepping pulses.

The train of unblocking pulses C, equal in number to the evolutionary codes stored on any page of read-only memory MP, comes to an end at instant $t_{k-6}$ in the latter part of the time slot. Next, at instant $t_{k-5}$, pulse T5 is generated to load the buffer register RU with the instruction (if any) appearing on output Y of memory MP; that instruction represents the updated activity code which is to appear in phase $r_i$ during the following scanning cycle.

At instant $t_{k-4}$, the setting of multiplexer MX is restored to its initial condition with the disappearance of pulses T1 and T2. Since programmer CK still emits on lead 7 the address code of the line link associated with phase $r_i$, that address is now transmitted on lead 30 to an input of register RE.

At instant $t_{k-3}$ the writing pulse W1 causes the inscription of the code from register RU in the second sector of phase $r_i$ and simultaneously unblocks the AND gate P2 for the passage of a discriminating bit, if present, from register RU via lead 21 to lead 35 for the setting of flip-flop DP and the discharge of register RE into lead 31 extending to the processor EL. The instruction from register RU, if thus read out to the processor on lead 31, is accompanied by the address from multiplexer MX.

At instant $t_{k-2}$ the pulse T1 reappears at multiplexer MX to switch same into its third position for transmittal of information from the processor, arriving over lead 34, to the address input 8 of memory MG. Processor EL is not synchronized with the scanning cycle of programmer CK so that the address information arriving at that point is not necessarily related to the line link identified by the phase being scanned, i.e. memory row $r_i$ in the present instance. That address controls the inscription of information in the third and fourth sectors of a memory phase $r$, via leads 32 and 33, upon the occurrence of writing pulse W2 at instant $t_{k-1}$. Thus, the processor may modify the contents of these two sectors of any phase $r$ in the terminal period of any time slot of a scanning cycle.

If the presence of a discriminating bit on lead 21 causes the setting of flip-flop DP, output 36 thereof transmits a "data ready" signal to the processor which responds with a resetting pulse for the flip-flop on its input 37. If necessary, a further buffer register (not shown) may be inserted between the processor and the register RE to allow the feeding of the contents of the latter register to the processor at a time independent of the scanning cycle.

It will thus be seen that the call monitor LS according to our invention decides what information, if any, should be forwarded to the processor EL, to the switching circuit RC and/or to the signal transmitter TS on the basis of signals arriving from signal receiver RS. This minimizes the number of interventions of the processor in the establishment and dissolution of a connection. The system is highly flexible since any change in the structure of the network can be accommodated simply by the storage of new data in read-only memory MP.

We claim:

1. A call monitor for an exchange serving a multiplicity of telecommunication lines through a set of line links which are periodically sampled by a scanner in respective time slots of a recurrent cycle for the establishment of connections therebetween by a switching network under the control of a central processor responsive to signals picked up from the sampled line links, comprising:

a first memory with a multiplicity of phases respectively assigned to said line links for storing data relating to the activities thereof;

programming means synchronized with said scanner for addressing successive phases of said first memory during time slots assigned to the sampling of the respective line links;

a second memory containing a multiplicity of evolutionary codes identifying all possible states in the progress of a connection between subscriber lines coupled to respective line links;

circuit means connecting said first memory with said processor for exchanging information therebetween;

temporary storage means for incoming code signals indicative of the activity of a line link during a time slot assigned thereto;

comparison means controlled by said programming means for reading out successive evolutionary codes from said second memory in the course of a time slot until the code signals entered in said temporary storage means match an evolutionary code thus read out, at least some of said evolutionary codes being accompanied in said second memory by instruction codes read out simultaneously therewith;

output means connected to said second memory for storing an instruction code accompanying a matching evolutionary code;

updating means connected to said output means and controlled by said programming means for inscribing the stored instruction code in a currently explored phase of said first memory as an activity information available during a subsequent cycle for starting the readout of evolutionary codes from said second memory;

discriminating means connected to said output means for determining from the nature of the stored instruction code whether same is pertinent to said processor; and transfer means responsive to said discriminating means for relaying a pertinent instruction code to said processor.

2. A call monitor as defined in claim 1 wherein said comparison means comprises a binary counter loadable from the currently explored phase of said first memory with said activity information, a comparator with input connections to said second memory and said storage means, and stepping means controlled by said comparator for advancing said counter a sufficient number of times during a fraction of a time slot to find the evolutionary code matching the code signals in said temporary storage means, said comparator inhibiting said stepping means in the presence of such a match.

3. A call monitor as defined in claim 2 wherein each phase of said first memory is divided into one sector permanently storing an address of the associated line link, another sector receiving said activity information, a further sector for the entry of information on the state of a connection, and an additional sector for the address of another line link communicating with said associated line link.

4. A call monitor as defined in claim 3 wherein said temporary storage means comprises a buffer register connected to receive, in an early part of a time slot allocated to said associated line link, the activity information of said associated line link and of said communicating line link from said other sector of each of the two phases assigned to said links, for transmission to said comparator together with said incoming code signals in the same time slot.

5. A call monitor as defined in claim 3 wherein said second memory is connected to receive the address of said associated line link from said one sector of the currently explored phase of said first memory together with the reading of said counter.

6. A call monitor as defined in claim 3 wherein said first memory has an address input switchable by said programming means to a feedback path from said additional sector of the currently explored phase for reading out to said temporary storage means the contents of said other sector of a phase identified by an address entered in said additional sector.

7. A call monitor as defined in claim 3 wherein said first memory is provided with writing means for enabling the inscription of state and address information in said further sector and in said additional sector of any phase during a terminal part of any time slot.

8. A call monitor as defined in claim 1 wherein said output means is provided with a direct connection for the delivery of a stored instruction code to said switching network independently of said processor.

* * * * *